US010317131B2

(12) United States Patent
Eicher et al.

(10) Patent No.: US 10,317,131 B2
(45) Date of Patent: Jun. 11, 2019

(54) DOMESTIC REFRIGERATION DEVICE HAVING AN INTERIOR LIGHTING ARRANGEMENT

(71) Applicant: BSH HAUSGERAETE GMBH, Munich (DE)

(72) Inventors: Max Eicher, Munich (DE); Philipp Kleinlein, Munich (DE); Bernd Osbar, Aalen (DE); Christian Schmid, Dietenheim (DE); Armin Weber, Lauchheim (DE); Andreas Danler, Voels (AT); Manfred Gstrein, Absam (AT); Georg Seebacher, Voels (AT)

(73) Assignee: BSH Hausgeraete GmbH, Munich (DE)

( * ) Notice: Subject to any disclaimer, the term of this patent is extended or adjusted under 35 U.S.C. 154(b) by 394 days.

(21) Appl. No.: 15/103,951

(22) PCT Filed: Dec. 10, 2014

(86) PCT No.: PCT/EP2014/077268
§ 371 (c)(1),
(2) Date: Jun. 13, 2016

(87) PCT Pub. No.: WO2015/086699
PCT Pub. Date: Jun. 18, 2015

(65) Prior Publication Data
US 2016/0313052 A1 Oct. 27, 2016

(30) Foreign Application Priority Data
Dec. 13, 2013 (DE) .................. 10 2013 225 958

(51) Int. Cl.
*F25D 27/00* (2006.01)
*F21V 23/04* (2006.01)
(Continued)

(52) U.S. Cl.
CPC .......... *F25D 27/00* (2013.01); *F21V 23/0464* (2013.01); *F21V 33/0012* (2013.01);
(Continued)

(58) Field of Classification Search
CPC .................. F25D 27/00; F21W 2131/305
See application file for complete search history.

(56) References Cited

U.S. PATENT DOCUMENTS

| 8,459,818 B2 | 6/2013 | Becke et al. |
| 2006/0138916 A1* | 6/2006 | Kordon ............... F21V 33/0044 312/223.5 |
| 2010/0170279 A1* | 7/2010 | Aoki ....................... F25D 11/02 62/264 |

FOREIGN PATENT DOCUMENTS

| CN | 101586901 A | 11/2009 |
| CN | 201462758 U | 5/2010 |

(Continued)

*Primary Examiner* — Andrew J Coughlin
(74) *Attorney, Agent, or Firm* — Laurence A. Greenberg; Werner H. Stemer; Ralph E. Locher

(57) ABSTRACT

A domestic refrigeration device includes a thermally insulated body with an internal compartment delimiting an interior coolable food storage space, a refrigeration apparatus cooling the interior space, a door leaf closing the interior space in a closed state and making the interior space accessible in an open state, and an interior lighting configuration illuminating the interior space with the door leaf open. The interior space has side walls with a depth, edges facing the door leaf, a ceiling and a rear wall rearwardly closing the interior space. The lighting configuration includes a first partial interior lighting configuration illuminating the interior space only at least approximately starting from a distance or space measured from the edges of the side walls facing the door leaf to the rear wall, and a second independent partial interior lighting configuration illuminating only a front region of the interior space facing the door leaf.

20 Claims, 4 Drawing Sheets

(51) Int. Cl.
    *F21V 33/00*     (2006.01)
    *F25D 11/00*     (2006.01)
    *F25D 23/06*     (2006.01)
    *F25D 25/02*     (2006.01)
    *F21V 8/00*     (2006.01)
    *F21W 131/305*     (2006.01)

(52) U.S. Cl.
    CPC ............ *F25D 11/00* (2013.01); *F25D 23/065* (2013.01); *F25D 25/02* (2013.01); *F25D 25/025* (2013.01); *F25D 27/005* (2013.01); *G02B 6/001* (2013.01); *F21W 2131/305* (2013.01); *F25D 2500/02* (2013.01)

(56) References Cited

FOREIGN PATENT DOCUMENTS

| | | |
|---|---|---|
| CN | 103328912 A | 9/2013 |
| CN | 103443566 A | 12/2013 |
| DE | 102008044302 A1 | 6/2010 |
| DE | 102010031696 A1 | 12/2011 |
| EP | 2437014 A1 | 4/2012 |
| JP | 2002257469 A | 9/2002 |
| JP | 2006336963 A | 12/2006 |
| JP | 2008070000 A | 3/2008 |
| JP | 2010008017 A | 1/2010 |
| JP | 2010281481 A | 12/2010 |

* cited by examiner

DOMESTIC REFRIGERATION DEVICE HAVING AN INTERIOR LIGHTING ARRANGEMENT

BACKGROUND OF THE INVENTION

Field of the Invention

The invention relates to a domestic refrigeration device having an interior lighting arrangement.

Domestic refrigeration devices generally comprise a coolable interior space for storing food products. The coolable interior space may be closed, for example, by means of a door leaf. When the door leaf is open the coolable interior space is accessible. Moreover, domestic refrigeration devices generally comprise an interior lighting arrangement which at least partially illuminates the coolable interior space when the door leaf is open.

DE 10 2010 031 696 A1 discloses a refrigeration device and/or freezer device which have two coolable interior spaces and which are cooled to different temperatures. The interior lighting arrangement is designed as a light column which extends over both coolable interior spaces. The light column may be designed as a vertically extending light strip, may comprise a plurality of LEDs or an optical waveguide and may extend in or on a wall of the coolable interior spaces. The interior lighting arrangement may be assisted by further lighting means which are only located in the respective coolable interior space.

DE 10 2008 044 302 A1 discloses a domestic refrigeration device having a coolable interior space and an interior lighting arrangement, the light beam thereof being located entirely in the coolable interior space.

JP 2010-281481 A and JP 2008-070000 A disclose in each case a domestic refrigeration device which comprises a photo sensor for measuring the brightness of the surroundings of the domestic refrigeration device in order to activate the interior lighting arrangement of said domestic refrigeration device depending on the brightness of the surroundings.

BRIEF SUMMARY OF THE INVENTION

It is the object of the present invention to provide a domestic refrigeration device having an improved interior lighting arrangement.

The object of the invention is achieved by a domestic refrigeration device which has a thermally insulated body with an internal compartment which delimits a coolable interior space which is provided for storing food products, a refrigeration apparatus for cooling the coolable interior space, a door leaf which is provided to close the coolable interior space in the closed state and to make said coolable interior space accessible in the open state, and an interior lighting arrangement for illuminating the coolable interior space when the door leaf is open, wherein the coolable interior space comprises two opposing side walls having a depth and having edges which face the door leaf, a ceiling and a rear wall which closes off the coolable interior space at the rear, and the interior lighting arrangement comprises at least one first partial interior lighting arrangement which is provided to illuminate the coolable interior space when the door leaf is open, only at least approximately starting from a distance measured from the edges of the side walls, which edges face the door leaf, as far as the rear wall, and a second partial interior lighting arrangement which is, in particular, arranged in or on the ceiling, which is independent of the first partial interior lighting arrangement and which is provided to illuminate only the front region of the coolable interior space, which front region faces the door leaf, when the door leaf is open.

The domestic refrigeration device according to the invention comprises the thermally insulated body with the internal compartment which defines the coolable interior space. Said interior space is cooled by means of the refrigeration apparatus. Said refrigeration apparatus is preferably configured as a refrigerant circuit which is known in principle to the person skilled in the art and which is preferably designed such that it cools the coolable interior space at least approximately to a predetermined temperature. The coolable interior space is provided for storing food products.

The domestic refrigeration device according to the invention may, for example, be a domestic refrigeration device. In this case, the coolable interior space is cooled to temperatures greater than 0° C. The domestic refrigeration device according to the invention may also be a domestic freezer device. In this case, the coolable interior space is cooled to temperatures of less than 0° C. The domestic refrigeration device according to the invention, however, may also be a combined fridge-freezer. The domestic refrigeration device according to the invention may comprise just one coolable interior space but also a plurality of coolable interior spaces which may also be closed and opened in each case by means of a door leaf. Each of the coolable interior spaces may have a separate interior lighting arrangement according to the invention.

According to the invention, the interior lighting arrangement of the domestic refrigeration device according to the invention comprises the first partial interior lighting arrangement and the second partial interior lighting arrangement. So that these partial interior lighting arrangements are only switched on when the door leaf is open, i.e. they are switched off when the door leaf is closed, the domestic refrigeration device according to the invention may have a door opening switch which is known in principle to the person skilled in the art.

The domestic refrigeration device according to the invention may also be configured as a wine cooler which is provided to store bottles filled with a drinkable liquid, in particular wine. In this case, the door leaf is preferably at least partially transparent, by being manufactured, for example, at least partially from glass. In particular, in this case the interior lighting arrangement is able to illuminate the coolable interior space even when the door leaf is closed.

The first partial interior lighting arrangement is designed such that when the door leaf is open it illuminates only the coolable interior space from a distance and/or at least approximately from a distance measured from the edges of the side walls, which edges face the door leaf, as far as the rear wall. When the door leaf is open, therefore, the first interior lighting arrangement illuminates only the rear region, preferably the rear and central regions of the coolable interior space, preferably as uniformly as possible, and therefore is not able to dazzle a person opening the domestic refrigeration device. When the door leaf is open, the second interior lighting arrangement is provided to illuminate only the front region of the coolable interior space facing the door leaf. Both partial interior lighting arrangements are independent of one another, i.e. the first partial interior lighting arrangement is provided for illuminating the rear region and/or the rear and central regions of the coolable interior space and the second partial interior lighting arrangement is provided for illuminating the front region of the coolable interior space. This results in a tiered illumination of the depth of the coolable interior space. The distance is selected, in particular, such that it corresponds to between ¼ to ½, preferably ⅓ of the depth of the side walls, so that when the door leaf is open the first interior lighting arrangement illuminates only the central and rear regions of the coolable interior space.

The second partial interior lighting arrangement illuminates, in particular, only the remaining coolable interior space. However, it is also possible that the two partial interior lighting arrangements illuminate a portion of the coolable interior space in an overlapping manner.

The second partial interior lighting arrangement is preferably arranged in or on the ceiling and thus radiates the light produced thereby from above into the front region of the coolable interior space. As it illuminates only the front region of the coolable interior space, there is less risk that a person is dazzled by the entire interior lighting arrangement. The second partial interior lighting arrangement preferably comprises as a lighting means at least one LED which is preferably covered by a transparent cover. This cover may be designed as a lens optical system and preferably extends flush with the ceiling of the coolable interior space. The lighting means of the second partial interior lighting arrangement may be arranged in a housing which is preferably fastened so as to be recessed in the ceiling, in particular is enclosed in foam in the ceiling. The side of the housing facing the lighting means is preferably designed so as to reflect light, so that the desired radiation characteristic of the light of the second partial interior lighting arrangement produced by the lighting means is obtained by a suitable shape of the housing.

According to a variant of the domestic refrigeration device according to the invention, the first partial interior lighting arrangement is arranged in or on one of the two side walls, in particular, at a distance from the corresponding edge of the relevant side wall, which edge faces the door leaf. However, it is also possible that in each case a first partial interior lighting arrangement is arranged in or on each of the two side walls, in particular, at a distance from the edges of the side walls, which edges face the door leaf. Thus the part of the interior lighting arrangement provided for illuminating the rear region of the coolable interior space may be arranged either only in or on one of the two sides walls or on both sides.

Preferably, the first partial interior lighting arrangement is fastened so as to be recessed in the relevant side wall, in particular enclosed in foam therein. A surface oriented in the direction of the coolable interior space, if present, may preferably extend flush with the side wall.

According to a preferred embodiment of the domestic refrigeration device according to the invention, the first partial interior lighting arrangement has an elongated lighting body which radiates light into the coolable interior space when the door leaf is open. The elongated lighting body is preferably arranged vertically in or on the side wall. Preferably, the lighting body is fastened so as to be recessed in the side wall, preferably enclosed in foam in the side wall, and, in particular, extends flush with the side wall. In order to maintain an illumination of the coolable interior space which is as uniform as possible, the lighting body preferably extends at least over the greatest part of the height of the side wall.

A plurality of shelves arranged on top of one another may be provided inside the coolable interior space of the domestic refrigeration device according to the invention and at least one drawer may be provided in the lower region of the coolable interior space. In this case, the elongated lighting body preferably extends at least over the greatest part of the part of the coolable interior space comprising the shelves.

According to a preferred embodiment of the domestic refrigeration device according to the invention, the lighting body is designed such that, when the door leaf is open, the light radiating into the coolable interior space illuminates the entire region of the coolable interior space from the lighting body to the rear wall and/or a portion of the light radiating into the coolable interior space radiates at right angles from the side wall in the direction of the coolable interior space, preferably at a maximum angle of 100° measured from the side wall in the direction of the rear wall. Thus it may be established that the first partial interior lighting arrangement illuminates only the rear region of the coolable interior space approximately at a distance from the front edges of the side walls as far as the rear wall and as uniformly as possible. Moreover, in order to illuminate reliably the region of the coolable interior space even closer to the rear wall of the interior space, the first partial interior lighting arrangement may additionally have a lighting means arranged relatively close to the rear wall, said lighting means, in particular, having a further lighting body which is preferably similar to the lighting body.

According to a preferred embodiment of the domestic refrigeration device according to the invention, the lighting body is configured as a continuous optical waveguide with two ends. The first partial interior lighting arrangement, therefore, may comprise at least one lighting means which, in particular, couples the light produced thereby at one of the two ends or in both ends into the optical waveguide. The lighting means is preferably configured as at least one LED and/or preferably comprises at least one LED. The lighting body configured as an optical waveguide may be configured to be relatively narrow, for example 10 to 15 mm.

In order to maintain an illumination of the coolable interior space which is as uniform as possible, in particular in the rear region thereof, the optical waveguide may preferably be configured such that the light coupled therein is uniformly distributed.

According to a further variant of the domestic refrigeration device according to the invention, the lighting body may comprise a plurality of LEDs arranged in succession. The lighting body may also, in particular, comprise a base body, the LEDs being fastened thereto. In order to maintain the desired radiation behavior of the lighting body, preferably the side of the base body facing the LEDs is designed to be reflective and the base body is shaped such that the light produced by the LEDs illuminates the entire region of the coolable interior space from the lighting body to the rear wall and/or a portion of the light radiated into the coolable interior space is bundled such that it radiates at right angles from the side wall in the direction of the coolable interior space, preferably at a maximum angle of 100° measured from the side wall in the direction of the rear wall.

As already explained, the second partial interior lighting arrangement is provided to illuminate only the front region of the coolable interior space when the door leaf is open. If, however, the surroundings of the domestic refrigeration device are sufficiently bright, the front region of the coolable interior space is also sufficiently brightly illuminated even if the second partial interior lighting arrangement is switched off. According to a variant, therefore, the domestic refrigeration device according to the invention may comprise a sensor for identifying the brightness of the surroundings of the domestic refrigeration device, wherein the domestic refrigeration device is configured when the door leaf is open to switch on the second partial interior lighting arrangement only when the brightness of the surroundings of the domestic refrigeration device falls below a predetermined or predeterminable value. The sensor may, for example, comprise at least one photo cell and/or may be configured as at least one photo cell.

Due to the two independent partial interior lighting arrangements, by combining and/or correctly dimensioning the lamp type appropriately to a corresponding position, a tiered illumination which is as uniform as possible may be produced, preferably with a constant lighting intensity in the coolable interior space. Depending on the embodiment, to this end a linear lamp and/or elongated lighting body is preferably attached vertically according to ca. ⅓ of the depth of the interior space. This serves for an illumination of the coolable interior space which is as uniform as possible and for illuminating the entire depth of the device approximately from the point of installation of the lighting body. The arrangement may be implemented both on one side and on both sides. The lamp type may preferably be implemented by means of LED strips and also by means of optical waveguides. In order furthermore to be able to ensure the flexibility of the shelves, the installation is preferably recessed in the internal compartment. The required lighting intensity of the food products stored in the front region, preferably in the front third of the coolable interior space, is preferably produced according to the ambient brightness in daylight or the second partial interior lighting arrangement which preferably comprises a lamp attached to the upper face of the interior space (ceiling) on the front face, with a lens optical system for the most optimal distribution of the light onto the food products.

If the first partial interior lighting arrangement comprises the optical waveguide, preferably a structure for coupling out the light may be attached to the rear face for uniform distribution of the coupled-out light. Preferably, the first partial interior lighting arrangement is designed as a module.

BRIEF DESCRIPTION OF THE SEVERAL VIEWS OF THE DRAWING

Exemplary embodiments of the invention are shown by way of example in the accompanying schematic drawings, in which.

DESCRIPTION OF THE INVENTION

Figure 1:
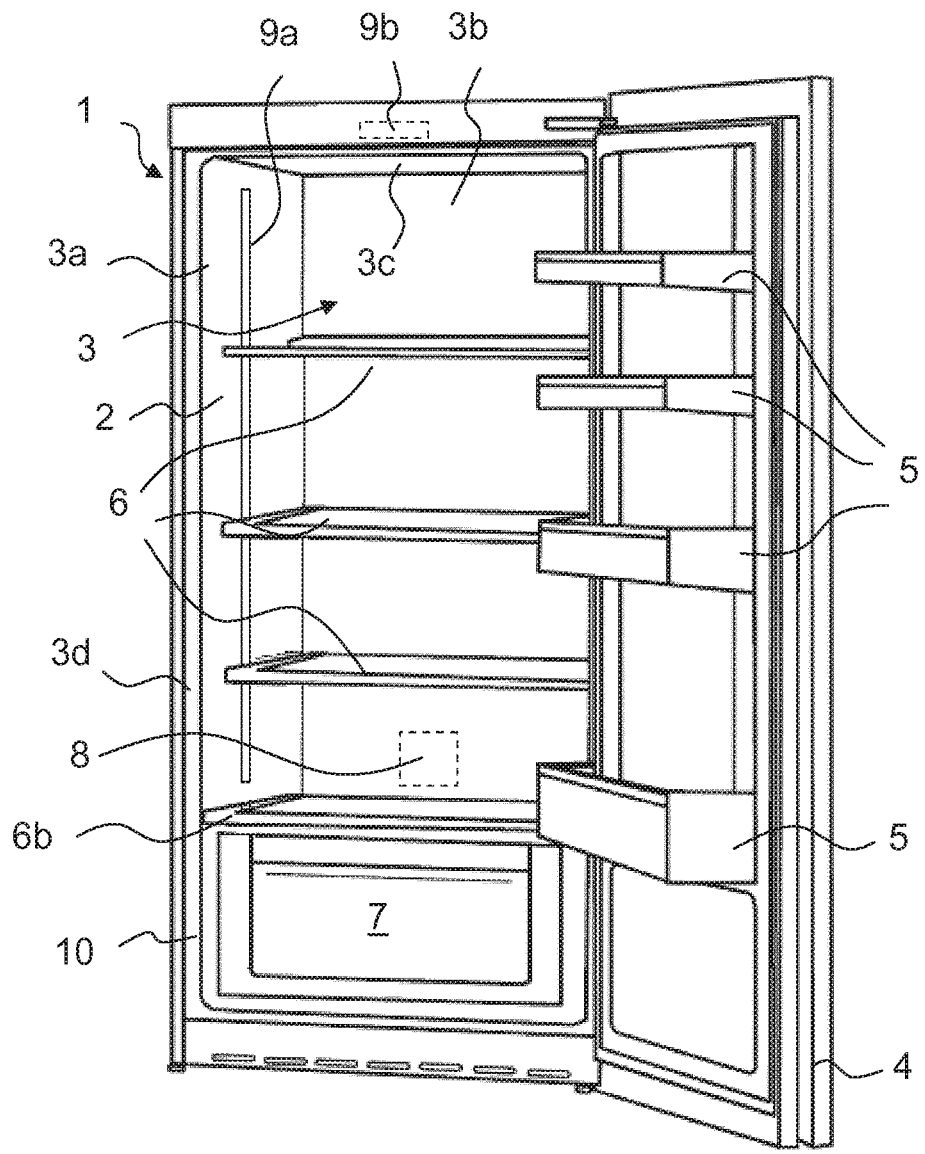
FIG. 1 shows a domestic refrigeration device comprising a first partial interior lighting arrangement and a second partial interior lighting arrangement in a perspective view.
Figure 2:
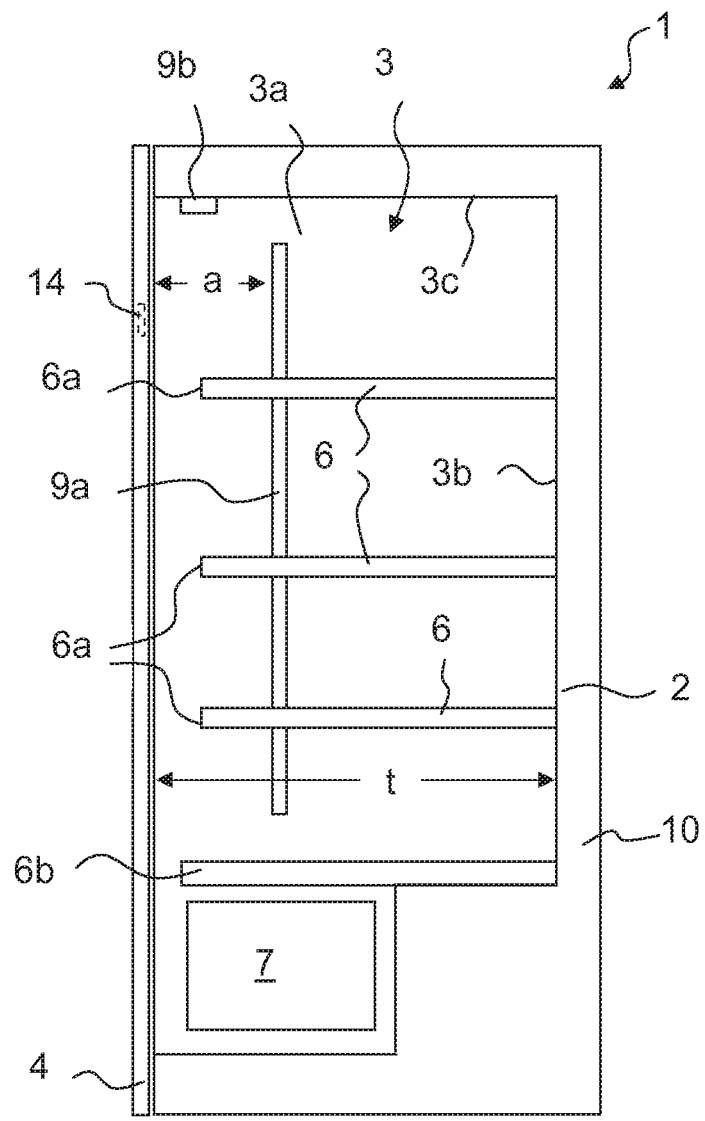
FIG. 2 shows in sectional view a side view of the domestic refrigeration device.
Figure 3:
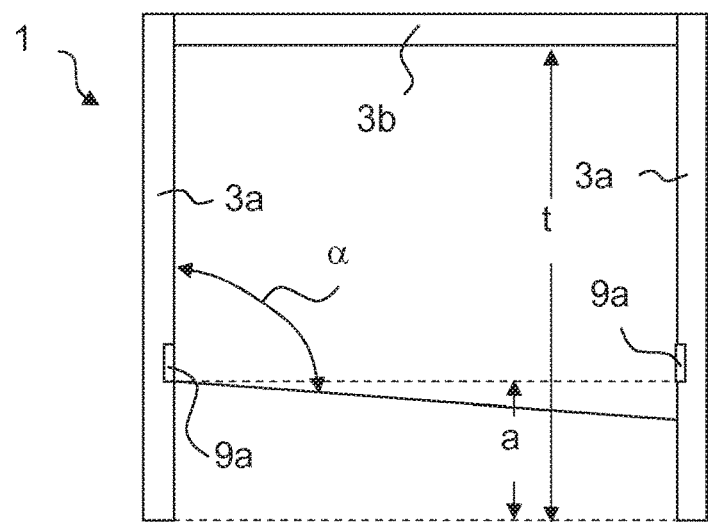
FIG. 3 shows in sectional view a plan view of the domestic refrigeration device.

FIG. 1 shows in a perspective view a domestic refrigeration device 1 which comprises a thermally insulated body 10 with an internal compartment 2, which defines a coolable interior space 3. FIG. 2 shows in a sectional view a side view of the domestic refrigeration device 1 and FIG. 3 shows in a sectional view a plan view of the domestic refrigeration device 1.

In the case of the present exemplary embodiment, the domestic refrigeration device 1 comprises a door leaf 4 which is pivotable relative to a vertically extending axis, not shown in more detail, for closing the coolable interior space 3.

The coolable interior space 3 is provided for storing food products, not shown in more detail, and comprises two side walls 3a located opposite one another, a rear wall 3b and a ceiling 3c. The coolable interior space 3 has a depth t which extends substantially from the side of the closed door leaf 4 oriented in the direction of the coolable interior space 3 and/or from the edges 3d of the side walls 3a facing the door leaf 4 as far as the rear wall 3b.

When the door leaf 4 is open, the coolable interior space 3 is accessible. In the case of the present exemplary embodiment, a plurality of door trays 5 for storing food products are arranged on the side of the door leaf 4 oriented in the direction of the coolable interior space 3. In particular, a plurality of shelves 6 for storing food products are arranged in the coolable interior 3 and, in particular, a drawer 7 is arranged in the lower region of the coolable interior space 3, food products also being able to be stored therein. A further shelf 6b is arranged above the drawer 7, said shelf covering the upwardly oriented opening of the drawer 7.

The domestic refrigeration device 1 comprises a refrigeration apparatus, known to the person skilled in the art in principle and not shown in more detail, preferably in the form of a refrigerant circuit for cooling the coolable interior space 3. The refrigerant circuit comprises, for example, a compressor, a condenser arranged downstream of the compressor, a throttle device which is arranged downstream of the condenser and which, in particular, is designed as a throttle tube or capillary tube and an evaporator which is arranged between the throttle device and the compressor.

The domestic refrigeration device 1 may be designed as a so-called no frost domestic refrigeration device.

In the case of the present exemplary embodiment, the domestic refrigeration device 1 comprises a control device 8 which, for example, comprises an electronic unit and is designed to activate the refrigeration apparatus, in particular the compressor of the refrigerant circuit, in a manner generally known by the person skilled in the art, such that the coolable interior space 3 at least approximately has a predetermined or predeterminable desired temperature. The control device 8 is preferably designed such that it controls the temperature of the coolable interior space 3. If required, in order to maintain the actual temperature of the coolable interior space 3, the domestic refrigeration device 1 may comprise at least one temperature sensor, not shown in more detail, which is connected to the control device 8.

In the case of the present exemplary embodiment, the domestic refrigeration device 1 comprises an interior lighting arrangement which is provided to illuminate the coolable interior space 3 only when the door leaf 4 is open. To this end, the domestic refrigeration device 1 may comprise a door opening switch, not shown in more detail.

Figure 5:
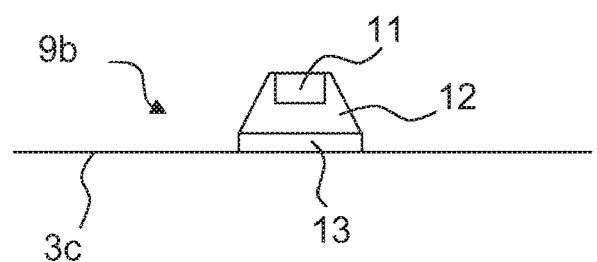
FIG. 5 shows the second partial interior lighting arrangement and FIG. 6 shows an alternative embodiment of the first partial interior lighting arrangement.

In the case of the present exemplary embodiment, the interior lighting arrangement comprises at least one first partial interior lighting arrangement 9a and a second partial interior lighting arrangement 9b. The first partial interior lighting arrangement is shown in more detail in FIG. 4 and the second partial interior lighting arrangement is shown in more detail in FIG. 5.

The first partial interior lighting arrangement 9a is arranged in or on one of the two sides walls 3a. However, two first partial interior lighting arrangements 9a may also be provided so that a first partial interior lighting arrangement 9a is arranged on or in each of the two side walls 3a in each case.

In the case of the present exemplary embodiment, when the door leaf 4 is open, the first partial interior lighting arrangement 9a is provided to illuminate the coolable interior space 3 only from a distance a measured from the edges 3d of the side walls 3a, which edges face the door leaf 4, as far as the rear wall 3b. The distance a ranges between a quarter and half of the depth t of the coolable interior space 3, and preferably ranges between a quarter and third of the depth t of the coolable interior space 3. Thus the first partial interior lighting arrangement 9a is designed such that it illuminates only the rear region of the coolable interior space 3 and/or approximately ⅔ to ¾ of the coolable interior space 3 as far as the rear wall 3b as uniformly as possible. Preferably, the first partial interior lighting arrangement 9a is designed such that when the door leaf is open 4 only the rear region of the coolable interior space 3 is illuminated as far as the shelf 6b which covers the drawer 7.

The second partial interior lighting arrangement 9b is provided to illuminate the front region of the remaining coolable interior space 3 facing the door leaf 4. The second interior lighting arrangement 9b comprises at least one lighting means 11 which is preferably designed as at least one LED and/or preferably comprises at least one LED. Preferably, the second partial interior lighting arrangement 9b is designed such that it also illuminates the pulled-out drawer 7.

The second partial interior lighting arrangement 9b is preferably arranged in or on the ceiling 3c in approximately the front third or front quarter of the coolable interior space 3.

In the case of the present exemplary embodiment, the second partial interior lighting arrangement 9b comprises a housing 12, the lighting means 11 of the second partial interior lighting arrangement 9b being arranged therein. In the direction of the coolable interior space 3 the housing 12 is provided with a transparent cover 13. The housing 12 is preferably enclosed in foam in the ceiling 3c and the ceiling 3c and the cover 13 preferably extend flush with one another.

Preferably, the second partial interior lighting arrangement 9b is designed such that it directs its light, i.e. the light produced by the lighting means 11, from above onto the shelves 6a, preferably in the region of the edges 6a of the shelves 6 oriented in the direction of the door leaf 4. Preferably, the second partial interior lighting arrangement 9b illuminates only approximately the front quarter to the front third of the coolable interior space 3. As a result, the risk of a person being dazzled by the interior lighting arrangement, in particular by the second partial interior lighting arrangement 9b, is at least reduced, if not completely prevented, when opening the door leaf 4 or when the door leaf is open 4. In order to achieve this, in the case of the present exemplary embodiment, the cover 13 of the second partial interior lighting arrangement 9b forms an optical system and/or a lens optical system which conducts the light produced by the lighting means 11 downwardly and into the coolable interior space 3 such that only the front regions of the shelves 6 are illuminated by the second interior lighting arrangement 9b. Alternatively or additionally, the surfaces of the housing 12 of the second partial interior lighting arrangement 9b facing the lighting means 11 at least partially reflect light and are configured such that the light of the lighting means 11 as described above only illuminates the front regions of the shelves 6 and/or the front quarter to the front third of the coolable interior space 3.

In the case of the present exemplary embodiment, it may be provided that the second partial interior lighting arrangement 9b may also be switched on depending on the brightness of the surroundings of the domestic refrigeration device 1. In sufficiently bright surroundings, when the door leaf 4 is open, the front region of the coolable interior space 3 is able to be sufficiently illuminated even when the second partial interior lighting arrangement 9b is switched off. Thus it may be provided that the second partial interior lighting arrangement 9b remains switched off even when the door leaf 4 is open, when the value of the brightness of the surroundings of the domestic refrigeration device 1 exceeds a predetermined or predeterminable value. This value may, for example, be entered by an input device of the domestic refrigeration device 1, not shown in more detail.

In order to determine the brightness of the surroundings of the domestic refrigeration device 1, in the case of the present exemplary embodiment said domestic refrigeration device comprises a sensor 14 for identifying the brightness of the surroundings of the domestic refrigeration device 1. The sensor 14 for identifying the brightness of the surroundings of the domestic refrigeration device 1 is preferably designed as at least one photo cell and/or comprises at least one photo cell. The sensor 14 and/or the photo cell is preferably arranged in or on the outwardly oriented side of the door leaf 4.

In the case of the present exemplary embodiment, the first partial interior lighting arrangement 9a comprises an elongated lighting body 30 for illuminating the coolable interior space 3 when the door leaf 4 is open. The elongated lighting body 30 is fastened in or on the side wall 3a and extends in the vertical direction. The elongated lighting body 30 is preferably arranged recessed in the side wall 3b. The elongated lighting body 30 extends in the vertical direction, in particular over at least the greatest part of the side wall 3a, at least over the greatest part of the side wall 3a from the ceiling 3c to the shelf 6b which covers the drawer 7.

In the case of the present exemplary embodiment, the lighting body 30 is relatively narrow. It has, for example, a width of 10 to 15 mm.

In the case of the present exemplary embodiment, the first partial interior lighting arrangement 9a, in particular the lighting body 30 thereof, is arranged at a distance a from the edge 3d of the side wall 3a facing the door leaf 4 in or on the side wall 3a.

In the case of the present exemplary embodiment, the lighting body 30 is configured as a continuous optical waveguide 31 and/or comprises the continuous optical waveguide 31 which is preferably fastened so as to be recessed in the side wall 3a.

The first partial interior lighting arrangement 9a comprises at least one lighting means 32 optically coupled to the optical waveguide 31, the light thereof being coupled into the optical waveguide 31 when the door leaf 4 is open. The lighting means 32 is preferably designed as at least one LED and/or comprises at least one LED.

In the case of the present exemplary embodiment, at least one lighting means 32 is provided at both ends 33 of the optical waveguide 31, said lighting means in each case being designed as at least one LED and/or comprising at least one LED. However, it may also be provided that a lighting means 32, preferably in the form of at least one LED, is provided at only one of the two ends 33 of the optical waveguide 31.

In the case of the present exemplary embodiment, the lighting means 32 are arranged inside the side wall 3a, in particular enclosed in foam in the side wall 3a. The lighting means 32 are, in particular, supplied with electrical power by electrical cables 34 when the door leaf is open 4. The electrical cables 34 preferably extend inside the side wall 3a. The lighting body 30 designed as an optical waveguide 31 may, in particular, extend with its side facing in the direction of the coolable interior space 3 flush with the side wall 3a.

In the case of the present exemplary embodiment, the lighting body 30 and/or the optical waveguide 31 is designed such that with its side facing the coolable interior space 3 the light coupled in by the lighting means 32 is coupled out into the coolable interior space 3. The lighting body 30 and/or the optical waveguide 31 is preferably designed such that the light coupled out into the coolable interior space 3 illuminates as far as possible the entire region of the coolable interior space 3 from the lighting body 30 and/or the optical waveguide 31 as far as the rear wall 3b. The lighting body 30 and/or the optical waveguide 31 is preferably designed such that a portion of the light coupled out into the coolable interior space 3 radiates at right angles from the side wall 3a in the direction of the coolable interior space 3, preferably at a maximum angle α of 100° measured from the side wall 3a in the direction of the rear wall 3b.

The optical waveguide 31 is preferably designed such that the light coupled in from the lighting means 32 is distributed as uniformly as possible in the optical waveguide 31 in order to illuminate the region provided by the first partial interior lighting arrangement 9b as uniformly as possible. To this end, the optical waveguide 31 may have on the rear face a suitable structure for coupling out the light.

Figure 4:
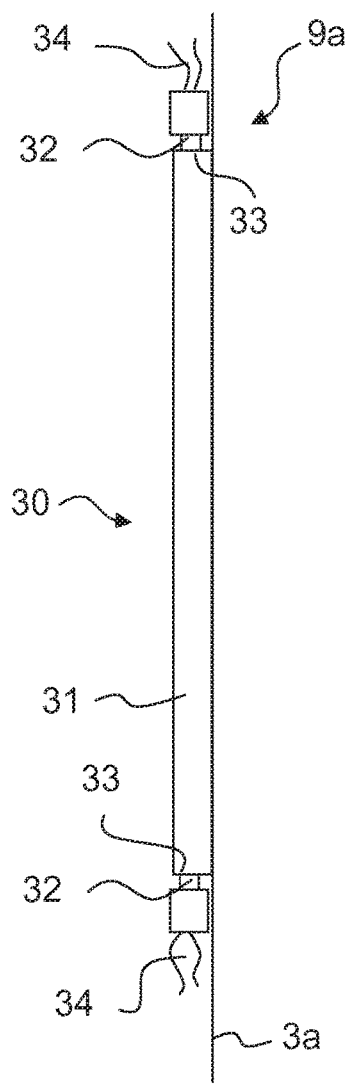
FIG. 4 shows the first partial interior lighting arrangement.
Figure 6:
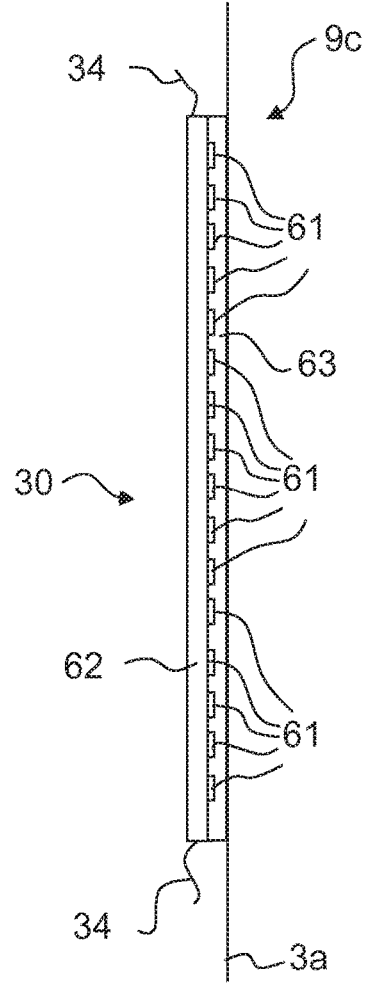

FIG. 6 shows an alternative embodiment of a first partial interior lighting arrangement 9c which may be used instead of the first interior lighting arrangement 9a shown in FIG. 4 for the domestic refrigeration device 1. If not described otherwise, components of the first partial interior lighting arrangement 9c shown in FIG. 6 which are substantially the same in terms of construction and function as the components of the first partial interior lighting arrangement 9a shown in FIG. 4 are provided with the same reference numerals.

Similar to the first partial interior lighting arrangement 9a shown in FIG. 4, just one of the side walls 3a of the coolable interior space 3 may be provided with a first partial interior lighting arrangement 9c. However, it may also be provided that both sides walls 3a are provided with one respective first partial interior lighting arrangement 9c.

The first partial interior lighting arrangement 9c shown in FIG. 6 differs from the first partial interior lighting arrangement 9a shown in FIG. 4 in that the elongated lighting body 30 does not comprise an optical waveguide 31 but a plurality of LEDs 61 arranged adjacent to one another, in particular in the form of an LED strip. The lighting body 30 may comprise an elongated base body 62, the LEDs 61 being fastened thereto. The LEDs 61 are supplied with electrical power by the electrical cables 34 when the door leaf 4 is open. The lighting body 30 may also comprise a transparent cover 63 for covering the LEDs 61. Preferably, the surface of the cover 63 oriented in the direction of the coolable interior space 3 extends flush with the side wall 3a.

So that the lighting body 30 of the first partial interior lighting arrangement 9c shown in FIG. 6 radiates the light produced by the LEDs 61 into the coolable interior space 3 such that as far as possible the entire region of the coolable interior space 3 is illuminated from the lighting body 30 to the rear wall 3b, the base body 62 with its side facing the LEDs 61 is preferably designed to be reflective and suitably shaped.

LIST OF REFERENCE NUMERALS

1 Domestic refrigeration device
2 Internal compartment
3 Coolable interior space
3a Side walls
3b Rear wall
3c Ceiling
3d Edges
4 Door leaf
5 Door tray
6 Shelves
6b Shelf
7 Drawer
8 Control device
9a First partial interior lighting arrangement
9b Second partial interior lighting arrangement
9c Second partial interior lighting arrangement
10 Body
11 Lighting means
12 Housing
13 Cover
14 Sensor
30 Lighting body
31 Optical waveguide
32 Lighting means
33 Ends
34 Electrical cable
61 LEDs
62 Base body
63 Cover
a Distance
t Depth
α Angle

The invention claimed is:

1. A domestic refrigeration device, comprising:
a thermally insulated body having an internal compartment delimiting a coolable interior space for storing food products;
a refrigeration apparatus for cooling said coolable interior space;
a door leaf for closing said coolable interior space in a closed state and for making said coolable interior space accessible in an open state;
said coolable interior space including two opposing side walls having a depth and having edges facing said door leaf, a ceiling and a rear wall rearwardly closing off said coolable interior space;
an interior lighting configuration for illuminating said coolable interior space when said door leaf is open;
said interior lighting configuration including at least one first partial interior lighting configuration for illuminating said coolable interior space only at least approximately from a distance measured from said edges of said side walls facing said door leaf to said rear wall, when said door leaf is open; and
said interior lighting configuration including a second partial interior lighting configuration independent of said first partial interior lighting configuration for illuminating only a front region of said coolable interior space facing said door leaf, when said door leaf is open.

2. The domestic refrigeration device according to claim 1, wherein said second partial interior lighting configuration is disposed in or on said ceiling.

3. The domestic refrigeration device according to claim 1, wherein said at least one first partial interior lighting configuration is disposed in or on one of said two side walls at a distance from said edge of said one side wall facing said door leaf.

4. The domestic refrigeration device according to claim 3, wherein said at least one first partial interior lighting configuration has an elongated lighting body radiating light into said coolable interior space when said door leaf is open.

5. The domestic refrigeration device according to claim 4, wherein said elongated lighting body is disposed vertically in or on said one side wall.

6. The domestic refrigeration device according to claim 5, wherein said elongated lighting body extends at least over a majority of a height of said one side wall.

7. The domestic refrigeration device according to claim 4, which further comprises:
   a plurality of shelves disposed on top of one another inside a part of said coolable interior space; and
   at least one drawer disposed in a lower region of said coolable interior space;
   said elongated lighting body being disposed vertically in or on said one side wall and extending at least over a majority of said part of said coolable interior space having said shelves.

8. The domestic refrigeration device according to claim 4, wherein said lighting body radiates light into said coolable interior space entirely illuminating a region of said coolable interior space from said lighting body to said rear wall, when said door leaf is open.

9. The domestic refrigeration device according to claim 4, wherein said lighting body radiates light into said coolable interior space and a portion of said radiated light radiates at right angles from said one side wall in a direction toward said coolable interior space.

10. The domestic refrigeration device according to claim 9, wherein said radiated light radiates at a maximum angle of 100° measured from said one side wall in a direction toward said rear wall.

11. The domestic refrigeration device according to claim 4, wherein said lighting body is a continuous optical waveguide with two ends, and said at least one first partial interior lighting configuration includes at least one lighting device.

12. The domestic refrigeration device according to claim 11, wherein said at least one lighting device couples light produced by said at least one lighting device into said optical waveguide at least at one of said two ends.

13. The domestic refrigeration device according to claim 12, wherein said optical waveguide uniformly distributes the light coupled therein.

14. The domestic refrigeration device according to claim 4, wherein said lighting body includes a plurality of LEDs disposed in succession.

15. The domestic refrigeration device according to claim 14, wherein said lighting body includes a base body to which said LEDs are fastened, said base body has a reflective side facing said LEDs, and said base body is shaped to cause light produced by said LEDs to entirely illuminate a region of said coolable interior space from said lighting body to said rear wall.

16. The domestic refrigeration device according to claim 14, wherein light radiates from said coolable interior space, and a portion of the light radiating from said coolable interior space is bundled to radiate at right angles from one of said side walls in a direction toward said coolable interior space.

17. The domestic refrigeration device according to claim 16, wherein the portion of the light radiating from said coolable interior space is bundled to radiate at a maximum angle of 100° measured from said one side wall in a direction toward said rear wall.

18. The domestic refrigeration device according to claim 1, wherein said at least one first partial interior lighting configuration includes two first partial interior lighting configurations each being disposed in or on a respective one of said two side walls at a distance from a respective one of said edges of said side walls facing said door leaf.

19. The domestic refrigeration device according to claim 3, wherein said second partial interior lighting configuration produces light illuminating only a front third of said coolable interior space.

20. The domestic refrigeration device according to claim 3, which further comprises a sensor for identifying a brightness of surroundings of the domestic refrigeration device, said second partial interior lighting configuration being switched on only when the brightness of the surroundings of the domestic refrigeration device falls below a predetermined or predeterminable value, when said door leaf is open.

* * * * *